United States Patent
Wang et al.

(10) Patent No.: US 12,518,183 B2
(45) Date of Patent: Jan. 6, 2026

(54) SOURCE LOCALIZATION METHOD FOR RUMOR BASED ON FULL-ORDER NEIGHBOR COVERAGE STRATEGY

(71) Applicant: Northwestern Polytechnical University, Xi'an (CN)

(72) Inventors: Zhen Wang, Xi'an (CN); Dongpeng Hou, Xi'an (CN); Xianghua Li, Xi'an (CN); Chao Gao, Xi'an (CN)

(73) Assignee: Northwestern Polytechnical University, Xi'an (CN)

( * ) Notice: Subject to any disclaimer, the term of this patent is extended or adjusted under 35 U.S.C. 154(b) by 657 days.

(21) Appl. No.: 17/970,718

(22) Filed: Oct. 21, 2022

(65) Prior Publication Data

US 2023/0046801 A1    Feb. 16, 2023

(51) Int. Cl.
*G06N 5/04* (2023.01)
*G06Q 50/26* (2012.01)

(52) U.S. Cl.
CPC .............. *G06N 5/04* (2013.01); *G06Q 50/265* (2013.01)

(58) Field of Classification Search
CPC ........... G06N 5/04; G06N 5/02; G06Q 50/265
See application file for complete search history.

(56) References Cited

U.S. PATENT DOCUMENTS

2016/0212163 A1*  7/2016  Louni ................. H04L 63/1408

FOREIGN PATENT DOCUMENTS

CN    109934727 A    6/2019

OTHER PUBLICATIONS

Luo et al., How to Identify an Infection Source with Limited Observations, IEEE, 2014, retrieved on Jul. 20, 2025, retrieved from the Internet<URL: https://ieeexplore.ieee.org/abstract/document/6782740> (Year: 2014).*

Luo et al., Estimating Infection Sources in a Network with Incomplete Observations, IEEE, 2013, retrieved on Jul. 20, 2025, retrieved from the Internet<URL: https://ieeexplore.ieee.org/abstract/document/6736875> (Year: 2013).*

(Continued)

*Primary Examiner* — Tyler J Torgrimson (57) ABSTRACT

Source localization method for rumor source based on full-order neighbor coverage strategy includes: constructing a network graph according to the user relationship in the actual target area; mapping an actual relationship into the network graph; determining sensors in the network graph, and deploying users corresponding to the sensors as observation users in an actual target area; executing a source inferring strategy when the number of the observation users in the actual target area who have received the rumor reaches an expected scale; calculating source likelihood score of non-sensor nodes in the network graph corresponding to the non-observation users in the actual target area; processing differentially the source likelihood scores; and outputting the non-observation user corresponding to the minimum source likelihood score as the source.

6 Claims, 8 Drawing Sheets

(56) References Cited

OTHER PUBLICATIONS

Dong Liu et al., A Study on Deployment Strategy of Efficient Observers for Locating Spreading Source, Journal of Chinese Information Processing, 2018, vol. 32, No. 8, pp. 120-127, School of Computer and Information Engineering, Henan Normal University, Xinxiang, Henan 453007, China.

Yubo Zhang et al., Observer Deployment Method for Locating the Information Source in Social Network, Journal of Software, 2014, vol. 25, No. 12, pp. 2837-2851, College of Information Science and Engineering, Northeastern University, Shenyang 110819, China.

\* cited by examiner

SOURCE LOCALIZATION METHOD FOR RUMOR BASED ON FULL-ORDER NEIGHBOR COVERAGE STRATEGY

CROSS-REFERENCE TO RELATED APPLICATIONS

This application claims the benefit of priority from Chinese Patent Application No. 202110819543.6, filed on Jul. 20, 2021. The content of the aforementioned application, including any intervening amendments thereto, is incorporated herein by reference in its entirety.

TECHNICAL FIELD

This application relates to the information propagation, and more particularity to a source localization method for a source based on full-order neighbor coverage strategy.

BACKGROUND

Source localization refers to detecting the source of hazard propagations in reality, such as rumors, infectious diseases, and computer viruses, so as to control the propagation process. As the connection becomes increasingly close, the risky spreading process will threaten the social stability. The spreading of rumors will adversely affect individuals, groups, society, and even the country, thereby seriously threatening people's production and life, social stability, and national security.

The graph in the network science can reasonably describe the interactive relationship between users on social platforms. In our real life, it is not easy to observe distance and relationship of two unfamiliar users, while this problem can be effectively solved by modeling a network graph based on the network science. Users involved on the internet can be represented by nodes in the graph, and the relationship of connected users is described by edges in the network graph. Therefore, the source of rumor spreading can be localized intuitively and efficiently with the help of the network graph. Considering that there are a relatively small number of real data sets related to propagation in the real world, in order to execute a localization method, it is required to predefine a propagation model to obtain the propagation data set. Common propagation models based on the network science include susceptible-infected (SI) model and susceptible-infected-recovery (SIR) model. These models mainly describe the state transition of nodes in the network graph over time. For example, at the beginning, all nodes in the network graph corresponding to the users in the actual target area are in a susceptible state, that is, the state in which no rumors are received. Once being infected, these users may try to spread rumors to their neighbors. At the same time, the users affected by rumors may also be aware and be forced to take some measures, and have a certain probability of converting to a recovery state, so that they have an ability to doubt the rumors (namely, no longer believe and spread the rumors). Applying these models to the internet can better show the processes where the users are influenced by rumors, spread and resist the rumors. However, these propagation models are too simple to be applicable to the real situation. Taking the social platform as an example, individuals react to rumors and forward messages differently, so their infected rates are unlikely to be the same. Moreover, it is also necessary to consider degree of intimacy and frequency of sending messages between two users, so the propagation time may vary. However, the current propagation models generally default to the same infection rate or the same propagation time, so that these simple propagation models cannot reflect the actual propagation situation well. In this case, the interpretability of the localization method in real situations needs to be improved. In view of this, a heterogeneous propagation model which is close to the real situation is proposed herein to map the complex internet environment, that is, each user has his own probability of spreading rumors, and the propagation time varies among the users. The method of the heterogeneous propagation model has enhanced prediction effect, rendering it more suitable for the real situation.

Source localization methods can be divided into three categories: complete observations, snapshots observations, and sensor-based observations (i.e., monitors, observers, honeypots). Regarding the complete observation methods, it is needed to obtain infection information of all nodes in the network graph, and then the global information is used to deduce the source localization. For the snapshots methods, the source localization is deduced based on the infection information of parts of nodes in the network graph. For the sensor-based methods, it is required to deploy a certain number of sensors in the network graph in advance, and these sensors can capture the infection information to monitor the network graph and execute the source localization in such a graph. It has been demonstrated by Paluch et al. (2020) that the sensor-based method has the highest localization efficiency among the three categories of observation methods. The source localization method was first proposed by Pinto et al. in 2012, in which candidate source nodes are taken as root nodes to generate a breadth-first search (BFS)-based structural topology map, and then the observation time delay and the theoretical time delay of the sensors are connected together through a time-delay covariance matrix, so that the non-sensor with the maximum likelihood score is considered as the source.

However, there are still many challenges in the source localization.

In the traditional localization methods, it is necessary to obtain more propagation information to obtain a more accurate localization result. However, in the practical application, it is time-consuming and labor-intensive to collect enough propagation information, and thus the conventional localization methods are not suitable for the real scenarios.

Current localization methods default in most cases that the infection propagates along the shortest path, which is a far-fetched assumption. In reality, whether it is network graph virus or influenza virus, the infection rate is relatively low, and in this case, the propagation occurs generally along a chained propagation path, instead of the shortest path. Therefore, the assumption that the infection spreads along the shortest path means a relatively high spreading rate deviates greatly from the actual scene and is unreasonable.

The existing source localization methods still struggle with poor accuracy (below 50%) in the actual scene. Although in some artificial synthetic datasets, the accuracy of the existing source localization methods is relatively high, but considering the relatively large scale of the real world, it is still difficult for some localization methods to reach a satisfying accuracy.

The difficulties in solving the above problems and defects are described as follows.

The collection of more propagation information requires higher labor cost and time cost. The localization is intended to infer the source as quickly as possible. So the earlier the source is localized, the more losses can be avoided. However, observed information related to a rumor source in the early propagation stage is relatively scarce, which increases the localization difficulty.

Removing the assumption of "propagation along the shortest path" will attenuate the propagation rate of the model. Under a high infection rate, the infected node will infect all its neighbors to the maximum extent, but under a low infection rate, the infected node will randomly infect its neighbors, so the propagation will become more random and the localization will be more difficult.

The real world has more users, and more complex relationship, and the localization method is more prone to localization errors.

SUMMARY

An object of the present disclosure is to provide a source localization method for rumor based on full-order neighbor coverage strategy to overcome the above-mentioned defects in the state-of-the-art methods. The algorithm structure is optimized to reach a localization accuracy of more than 50% with less propagation information, and at the same time, the method has less time consumption and thus can reduce losses caused by adverse effect.

Technical solutions of the present disclosure are described as follows.

This application provides a source localization method for rumor based on full-order neighbor coverage strategy, including:

(S1) inputting a user relationship database in an actual target area requiring sensor deployment and source localization;

(S2) constructing and initializing a network graph G=(V, E) based on the actual target area; wherein after the user relationship database is input, an actual relationship is mapped into the network graph G; V is a set of nodes corresponding to users in the actual target area; E is a set of edges, and the connected edges in the network graph G indicate that corresponding two users know each other in the actual target area; and all nodes in the network graph G are initialized to a susceptible state which means the corresponding users in the actual area do not receive a rumor;

(S3) deploying observation users in an actual target area according to the network graph G; wherein sensors are selected in the network graph G with a deployment ratio φ using a full-order neighbor coverage strategy; the full-order neighbor coverage strategy is configured to ensure that there are sensors in each order neighbor of any node in the network graph G; and users in the actual target area corresponding to the deployed sensors in G are marked as the observation users to record time and direction when they receive propagation information of the rumor;

(S4) when the number of observation users who have received rumor's propagation information reaches 4 in the actual target area, performing a source inferring strategy to detect a source of the rumor;

(S5) mapping time and direction recorded by the observation users to the network graph G;

(S6) locating the source of the rumor by using graph theory with a topological structure of G; wherein an initial source likelihood scores of non-sensor nodes in the network graph G are calculated by using a formula combining "minimum infection center" and "time-distance ratio";

(S7) differentially processing the source likelihood scores; wherein for any non-sensor node, if there is a first-order neighbors belonging to sensors who has not received the rumor's propagation information, the source likelihood score of such a non-sensor node is multiplied by a penalty coefficient α to reduce possibility of a corresponding user becoming the rumor source; and α is a real number between 1 and 1.1;

(S8) traversing all non-sensor nodes, and obtaining nodes with a minimum source likelihood score; and predicting the user in the actual target area related to the nodes with a minimum source likelihood score in G as an original rumor source in real life.

In an embodiment, the step (S3) is performed through steps of:

(S31) selecting initially sensors in the network graph G by using the full-order neighbor coverage strategy to ensure that for each node in the network graph G, there is at least one sensor in each order neighbor from a first-order neighbor to an eccentricity-order neighbor of the node, so as to allow the sensors to be widely deployed in the network graph G;

(S32) determining whether a ratio of the sensors selected by using the full-order neighbor coverage strategy to the network graph G reaches the deployment ratio φ; if no, further selecting non-sensor nodes in G by using other strategies; and selecting more sensors in G until the deployment ratio φ is reached; and (S33) marking the users who are sensors in the network graph G as the observation users in the actual target area.

In an embodiment, in the step (S6), an initial source likelihood score of non-sensor nodes in the network graph G corresponding to the non-observation users in the actual target area is calculated through the following formula:

$$\text{Score}'_v = \sqrt[4]{\left(\sum_{i=1}^{i=|\overline{O}|} d_{i,v}\right)^3} * \sqrt[3]{\left(\sum_{i=1}^{i=|\overline{O}|} \frac{t_i}{d_{i,v}}\right)^2};$$

wherein Score'$_v$ is an initial source likelihood score of a non-sensor node v in the network graph G corresponding to the non-observation user in the actual target area; $\overline{O}$ is a set of sensors in G corresponding to the observation users who have received the propagation information of the rumor in the actual target area; $|\overline{O}|$ represents the number of elements in the $\overline{O}$, and $|\overline{O}|$ is 4; $d_{i,v}$ is the shortest distance between a sensor i and a non-sensor node v in G; and $t_i$ represents a relative infection time of the sensor i in G corresponding to the observation user in the actual target area.

In an embodiment, in the step (S7), the source likelihood score is processed through the following formula:

$$\text{Score}_v = \text{Score}'_v * \Pi_{j=1}^{j=|neighbor(v) \cap O \setminus \overline{O}|} \alpha;$$

wherein Score'$_v$ is an initial source likelihood score of a non-sensor node v in the network graph G corresponding to the non-observation user in the actual target area obtained in the step (S6); α is the penalty coefficient configured to increase penalty for nodes in G corresponding to users in the actual target area who are unlikely to be the source of the rumor, and is equal to 1.05; neighbor(v) is a first-order neighbor of a non-sensor v in G; O is a set of the sensors corresponding to the observation users with the deployment ratio φ in the actual target area, and the deployment ratio φ is 20%, 30% or 40%; and $\overline{O}$ is a set of sensors corresponding to the observation users in the actual target area who have received the propagation information of the rumor.

In an embodiment, the deployment ratio φ is 20%, 30% or 40%.

In an embodiment, the penalty coefficient α is 1.05.

In an embodiment, in step (S32), the other strategies comprise random selection of sensors and selection of nodes with the highest degree in the network graph G as the sensors.

Compared to the prior art, the present disclosure has the following beneficial effects.

1. The technical solution of the present disclosure improves the localization efficiency, and the propagation source can be found earlier and more accurately. More specifically, the present disclosure proposes the idea of "early detection and early localization" to find the propagation source as soon as possible. Based on this idea, predicting the propagation source in a smaller area improves the localization accuracy, and detects the propagation source earlier to reduce the damage and loss caused by rumors. Since the algorithm can always locate the propagation source in a small area, the algorithm has the high localization accuracy in small network graphs and large network graphs.

2. The source localization method for a network graph rumor based on full-order neighbor coverage strategy only needs a small number of sensors to locate the rumor propagation source in a small area. Therefore, it only needs the local sensor information in the area instead of the global sensor information to perform the rumor localization method, thereby reducing the information required for localization.

3. The time complexity of the algorithm is relatively low. The localization method has completed the necessary work accurately in the deployment stage of the sensors. Combined with the idea and principle of the localization method, the source likelihood score formula only needs the O(1) time complexity to calculate a single node, and the calculation of all the global nodes also only needs the complexity of (|V|), where V is the set of nodes of the network graph G.

DETAILED DESCRIPTION OF EMBODIMENTS

The disclosure will be described clearly and completely below to make the objectives, technical solutions and technical effects of the present disclosure clearer. Obviously, described below are merely some embodiments of the disclosure, which are not intended to limit the disclosure. Based on the embodiments provided herein, all other embodiments obtained by those skilled in the art without paying creative efforts shall fall within the scope of the present disclosure.

Figure 1:
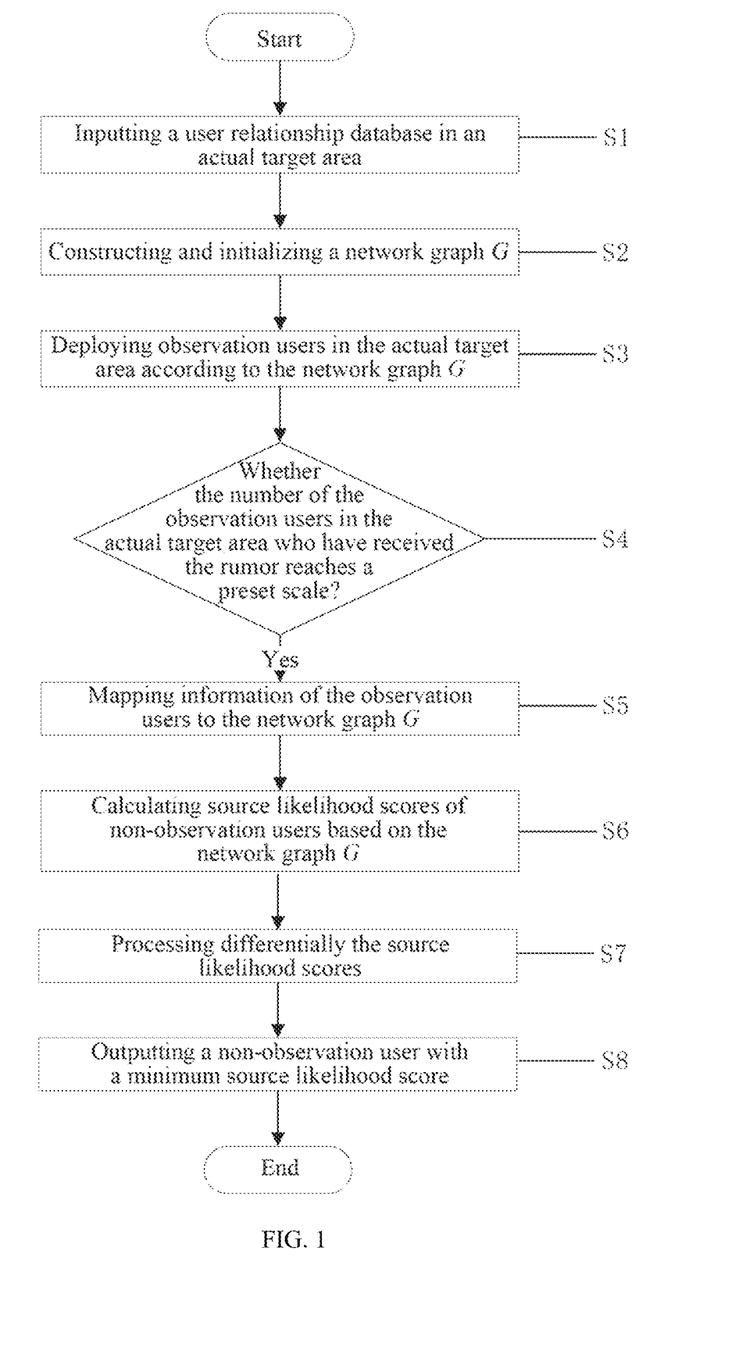
FIG. 1 is a flowchart of a source localization method for rumor based on full-order neighbor coverage strategy according to an embodiment of the present disclosure.

As shown in FIG. 1, a source localization method for a network graph rumor based on full-order neighbor coverage strategy is provided, which includes the following steps.

A user relationship database in an actual target area requiring sensor deployment and source localization is input (step S1).

A network graph G=(V,E) is constructed and initialized based on the actual target area. After the user relationship database is input, an actual relationship is mapped into the network graph G; V is a set of nodes corresponding to users in the actual target area; E is a set of edges, and the connected edges in the network graph G indicate that corresponding two users know each other in the actual target area; and all nodes in the network graph G are initialized to a susceptible state which means the corresponding users in the actual area do not receive a rumor (step S2).

Observation users are deployed in the actual target area by applying the graph theory for the network graph G. Sensors are selected in G with a deployment ratio φ using the full-order neighbor coverage strategy, where the full-order neighbor coverage strategy is configured to ensure that there are sensors in each order neighbor of any node in the network graph G; and users in the actual target area corresponding to the deployed sensors in G are marked as the observation users to record time and direction when they receive propagation information of the rumor (step S3). In this embodiment, the deployment ratio φ is 20%, 30% or 40%.

When the number of observation users who have received rumor's propagation information reaches 4 in the actual target area, performing a source inferring strategy to detect a source of the rumor (step S4).

Observed information (i.e., time and direction) recorded by the observation users is mapped to the network graph G (step S5).

Locating the source of the rumor by using graph theory with a topological structure of G; wherein an initial source likelihood scores of non-sensor nodes in the network graph G are calculated by using a formula combining "minimum infection center" and "time-distance ratio" (step S6).

The source likelihood scores are differentially processed. For any non-sensor node, if there is a first-order neighbors belonging to sensors who has not received the rumor's propagation information, the source likelihood score of such a non-sensor node is multiplied by a penalty coefficient α to reduce possibility of a corresponding user becoming the rumor source; and α is a real number between 1 and 1.1 (step S7). In this embodiment, α is 1.05.

All non-sensor nodes in the network graph G are traversed, and obtaining nodes with a minimum source likelihood score; and predicting the user in the actual target area related to the nodes with a minimum source likelihood score in G as an original rumor source in real life (step S8).

In this embodiment, the step (S3) is performed through the following steps. Sensors are initially selected in the network graph G by using the full-order neighbor coverage strategy to ensure that for each node in the network graph G, there is at least one sensor in each order neighbor from a first-order neighbor to an eccentricity-order neighbor of the node, so as to allow the sensors to be widely deployed in the network graph G (step S31). It is determined whether a ratio of the sensors selected by using the full-order neighbor coverage strategy to the network graph G reaches the deployment ratio φ; if no, further selecting non-sensor nodes in G by using other strategies; and selecting more sensors in G until the deployment ratio φ is reached (step S32). The users who are sensors in the network graph G are marked as the observation users in the actual target area (step S33). The other strategies include random selection of sensors and selection of nodes with the highest degree in G as the sensors. In this embodiment, selection strategy of nodes with the highest degree in the network graph G as the sensors is used.

In the step (S6), an initial source likelihood score of non-sensor nodes in the network graph G corresponding to the non-observation users in the actual target area is calculated through the following formula:

$$\text{Score}'_v = \sqrt[4]{\left(\sum_{i=1}^{i=|\overline{O}|} d_{i,v}\right)^3} * \sqrt[3]{\left(\sum_{i=1}^{i=|\overline{O}|} \frac{t_i}{d_{i,v}}\right)^2};$$

wherein $\text{Score}'_v$ is an initial source likelihood score of a non-sensor node v in the network graph G corresponding to the non-observation user in the actual target area; $\overline{O}$ is a set of sensors in G corresponding to the observation users who have received the propagation information of the rumor in the actual target area; $|\overline{O}|$ represents the number of elements in the $\overline{O}$, and $|\overline{O}|$ is 4; $d_{i,v}$ is the shortest distance between a sensor i and a non-sensor node v in G; and $t_i$ represents a relative infection time of the sensor i in G corresponding to the observation user in the actual target area.

In the step (S7), the source likelihood score is processed through the following formula:

$$\text{Score}_v = \text{Score}'_v * \Pi_{j=1}^{j=neighbor(v) \cap O \setminus \overline{O}} \alpha;$$

wherein $\text{Score}'_v$ is an initial source likelihood score of a non-sensor node v in the network graph G corresponding to the non-observation user in the actual target area obtained in the step (S6); α is the penalty coefficient configured to increase penalty for nodes in G corresponding to users in the actual target area who are unlikely to be the source of the rumor, and is equal to 1.05; neighbor(v) is a first-order neighbor of a non-sensor v in G; O is a set of the sensors corresponding to the observation users with the deployment ratio φ in the actual target area, and the deployment ratio φ is 20%, 30% or 40%; and $\overline{O}$ is a set of sensors corresponding to the observation users in the actual target area who have received the propagation information of the rumor.

Table 1 shows a scale of test dataset.

TABLE 1

Scale of test dataset

| Dataset | Number of Nodes | Number of Edges | Average Degree |
|---|---|---|---|
| Jazz | 198 | 2742 | 27.7 |
| Facebook | 4039 | 88234 | 43.7 |
| Twitch-ES | 4648 | 59382 | 25.55 |
| Wiki-Vote | 7115 | 103689 | 29.15 |
| Facebook-Large | 22470 | 171002 | 15.22 |
| GitHub Social | 37700 | 289003 | 15.33 |

Figure 2A:
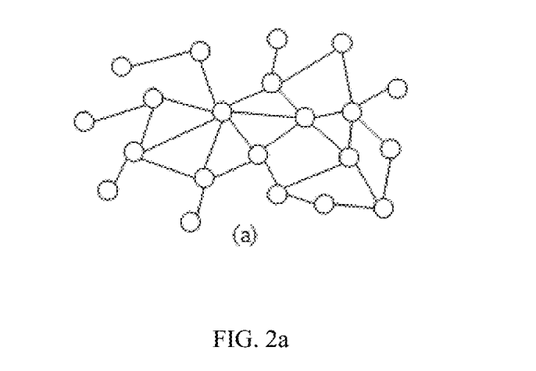
FIGS. 2a-2d illustrate four parts of the source localization method for rumor source based on full-order neighbor coverage strategy according to an embodiment of the present disclosure, where 2a: construction of network graph and mapping the users in an actual target area to the network graph; 2b: selection of sensors; 2c: using a graph theory combining "minimum infection center" and "time-distance ratio" to compute the source likelihood score of non-sensor nodes in the network graph; and 2d: outputting the non-sensor node in the network graph with the minimum score corresponding to the non-observation in the actual target area.
Figure 2B:
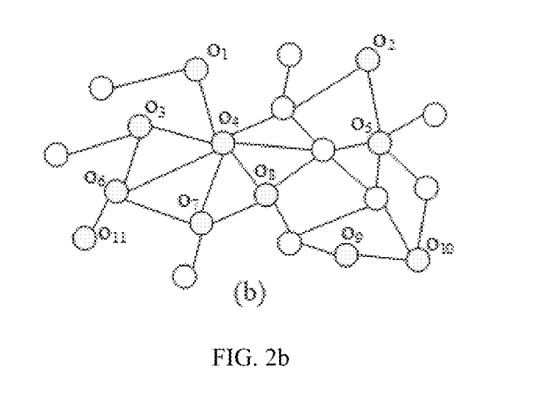
Figure 2C:
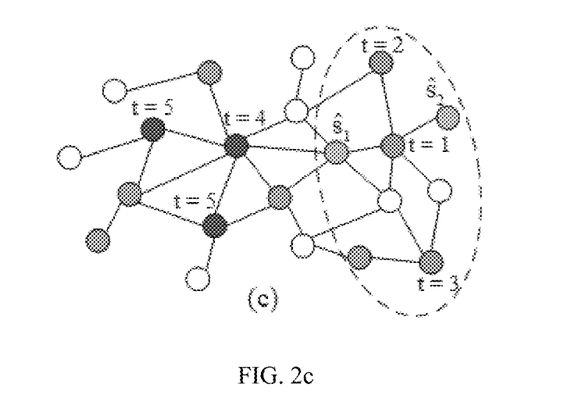
Figure 2D:
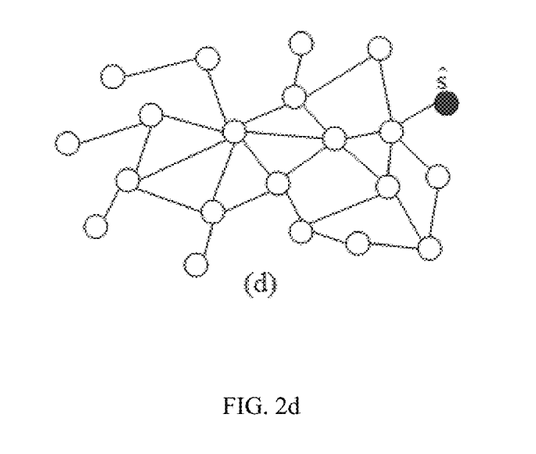
Figure 3:
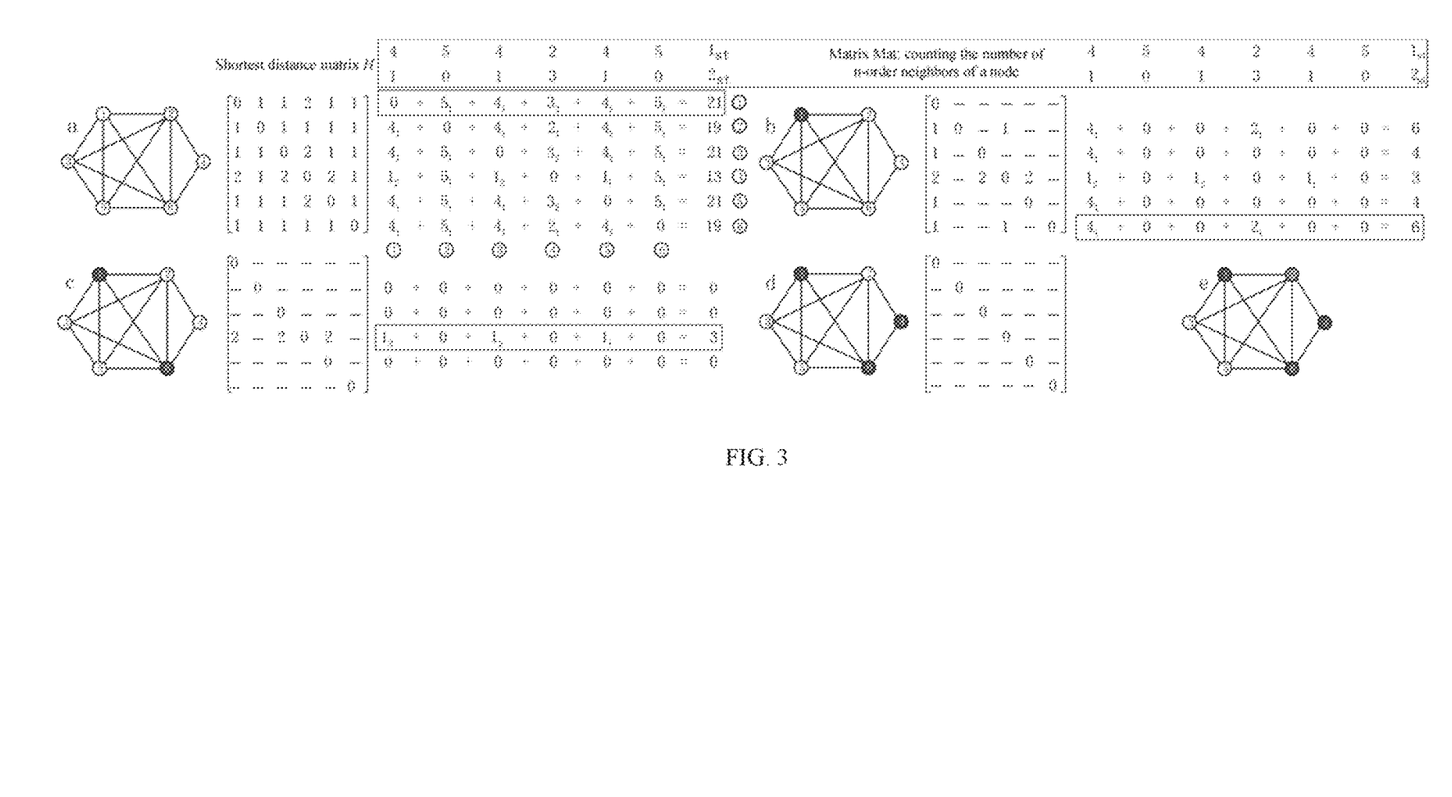
FIG. 3 schematically illustrates a full-order neighbor coverage strategy for screening sensors according to an embodiment of the present disclosure.
Figure 4:
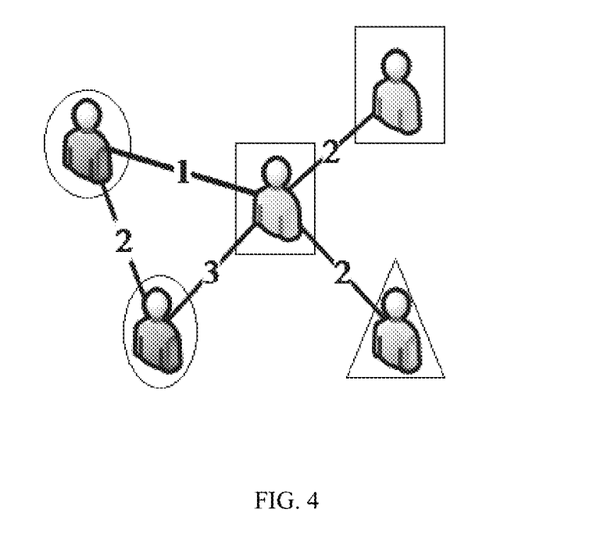
FIG. 4 is a diagram of a heterogeneous network graph for source localization according to an embodiment of the present disclosure.
Figure 5:
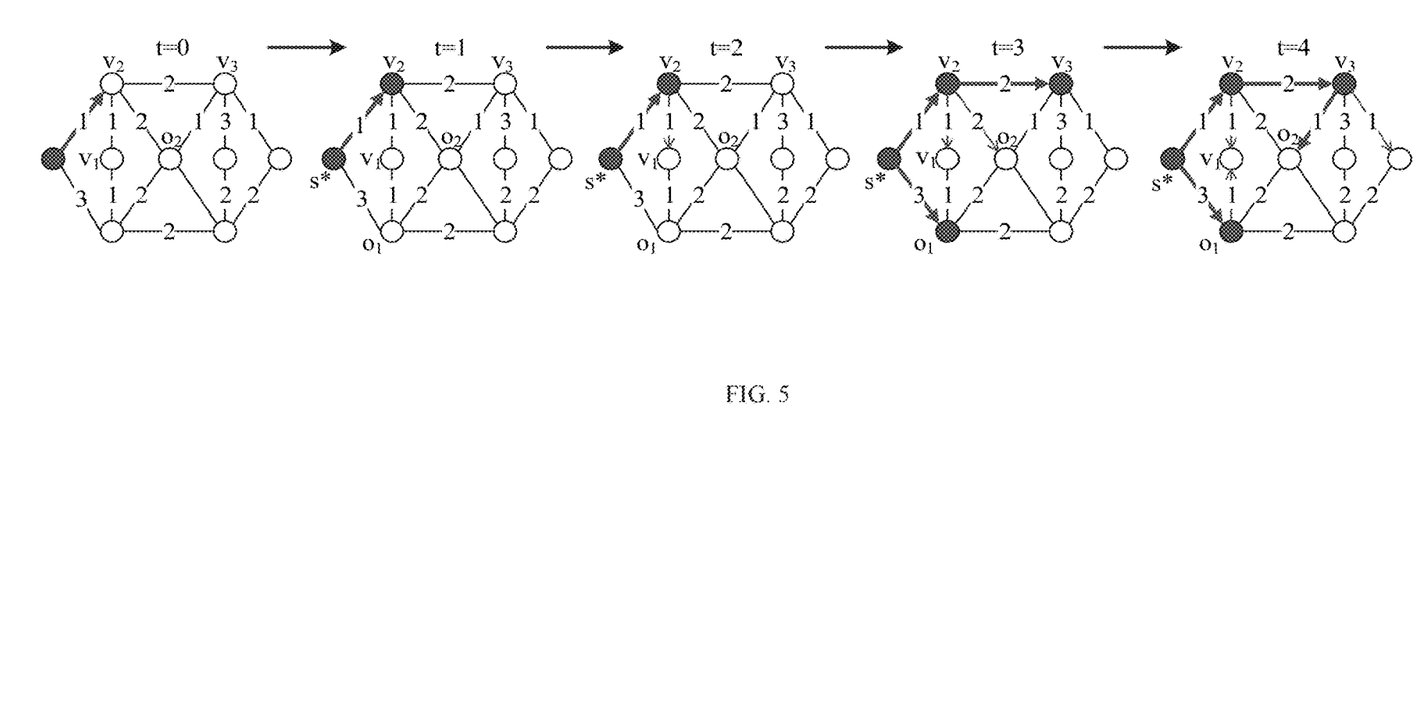
FIG. 5 is a diagram of a heterogeneous propagation model for source localization according to an embodiment of the present disclosure.

FIGS. 2a-2d illustrate four parts of the source localization method for rumor source based on full-order neighbor coverage strategy, where 2a: construction of network graph structure; 2b: selection of sensors; 2c: mapping of information of observation users to the network graph; and 2d: outputting of the non-observation user with the minimum source likelihood score. Specifically, the execution process can be divided into four modules of (a-d). (a) The network graph structure, the deployment ratio of sensors and the number of sensors are determined. (b) All sensors are screened by the full-order neighbor coverage strategy, as shown in FIG. 3. When the sensors to be deployed are determined, these users corresponding to the sensors are marked as the observation users in the actual target area. When rumors appear, and a certain amount of information is captured, identifying the rumor propagation source can be done. For proving the feasibility of the algorithm in the present disclosure, it needs to define a propagation model in line with the real situation mentioned above to ensure the integrity of the algorithm process. FIG. 4 and FIG. 5 show the practical heterogeneous propagation models according to the present disclosure. (c) According to the propagation model in FIG. 4 and FIG. 5, if the rumor has appeared and spread, the corresponding observation users have collected time information, and the observation user information is mapped into the network graph. A formula combining "minimum infection center" and "time-distance ratio" is then performed to calculate the source likelihood score for nodes of the non-sensor. The likelihood scores of nodes $\hat{s}_1$ and $\hat{s}_2$ are calculated with formula:

$$\hat{s}_1 = \hat{s}_2 = \sqrt[4]{(1+2+3)^3} * \sqrt[3]{\left(\frac{1}{1}+\frac{2}{2}+\frac{3}{3}\right)^2}.$$

(d) The minimum likelihood score determined by adding a penalty coefficient is the predicted rumor propagation source. The likelihood scores of the nodes $\hat{s}_1$ and $\hat{s}_2$ after adding the penalty coefficient are calculated as $\hat{s}_1 = \hat{s}_1 * 1.05$, $\hat{s}_2 = \hat{s}_2 * 1$, respectively. Therefore, the rumor propagation source is $\hat{s}_1$ with the minimum likelihood score. Thus, the user corresponding to $\hat{s}_1$ in the actual target area is the rumor propagation source predicted in the embodiment of the present disclosure.

FIG. 3 shows a diagram of the full-order neighbor coverage strategy for screening sensors in the embodiment of the present disclosure. Mat is a matrix that records the number of neighbors at the nth order of each node. Since the radius of the network graph G in the FIG. 3 is 2, Mat has only two rows. The first row represents the number of neighbors at the first order of each node, and the second row represents the number of neighbors at second order of each node. The matrix H represents the shortest distance matrix of each node in the network graph G. Suppose we intend to deploy four sensors in the network graph G. FIG. 3(a-d) show the deployment process of the sensors covering the whole network graph G. For the calculation formula in the box in FIG. 3, the value to the right of the equal sign in the n-th row represents the greedy value calculated by the node n in this step, and the node with the largest greedy value is always selected in each step as the sensor. The right subscript of each element on the left of the equal sign represents the shortest distance $h_{ij}$ between the node i and the node j, which can be found in the matrix H. The numerical value in Mat represents the number of $h_{ij}$ for the node j. For the legend a, the right subscript of the second element on the left of the equal sign in the first row represents the shortest distance between the node 1 and the node 2, and the shortest distance is 1 which can be obtained from H in the legend a. Then, taking the node 2 as the center, the number of neighbors with a distance of 1 is found, and we can find that the number is 5 by indexing the Mat. Thus, the number of the second element in the first row involved in the calculation is 5. The other nodes are calculated in the same way. Finally, it can be found that the selected values of node 1, node 3 and node 5 are the same. Therefore, we randomly choose node 1 as the first sensor. Then the same numerical values corresponding to each row in H is recorded as empty, that is, the element is set as 0 during calculation. Through legends a to d, three sensors which are solid nodes in the legends can be filtered out. The H matrix does not have non-zero values. However, there are not enough four sensors yet, so the highest degree strategy is adopted here. The degree of the node 2 is the largest among the remaining nodes, so legend e is added to the set of sensors, that is, the node 2 in legend e.

FIG. 4 shows the heterogeneous network graph of the heterogeneous propagation model used by the present disclosure. In the legend of FIG. 4, the oval boxes represent objects with a relatively high infection rate, the rectangular boxes represent objects with a moderate infection rate, and the triangular boxes represent objects with a low infection rate. The lines marked with "3" indicates that the two objects corresponding to two lines do not contact frequently or actual distance between the two objects is relatively far, and one data interaction is performed on average of three time steps. The line marked with "1" indicates that the two objects contact frequently, and one data interaction is performed on average of one time step.

FIG. 5 shows a heterogeneous propagation model based on the heterogeneous network graph for constructing a propagation data set in the embodiment of the present disclosure. In the legend, the infection rates of all nodes are assumed to be 50%. s* represents the source node, and $o_1$ and $o_2$ represent the sensors which are pre-deployed in the network graph. The infection is spread from the tail end to the tip end of the arrow between the two solid nodes. An arrow having the thin line indicates that the infection is unsuccessful at this time stamp. For $o_1$, the node is infected at t=3 and tried to infect its neighbor $v_1$ at t=4, but without success. For $o_2$, at t=1, its infected neighbor $v_2$ starts to send the virus to $o_2$, and the virus reaches $o_2$ at t=4, but without success. Similarly, the infected $v_3$ spreads the virus to $o_2$ at t=3, the virus reaches $o_2$ at time t=4, but the infection is not successful.

Figure 6:
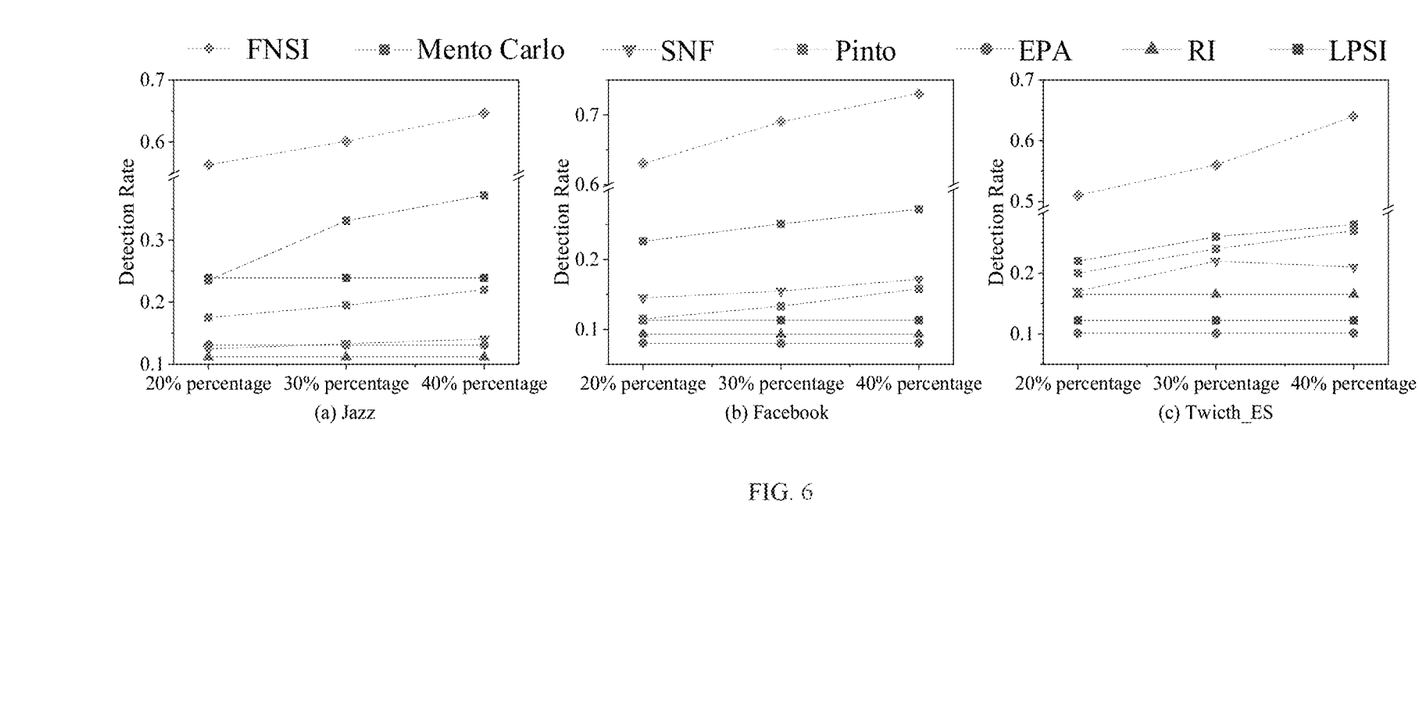
FIG. 6 is a schematic diagram showing the average accuracy of single-source localization on three real network graphs of Jazz, Facebook, and Twitch-ES according to an embodiment of the present disclosure.

After the propagation data set is constructed, the corresponding rumor propagation source in the actual target area can be deduced according to the valid information. In order to prove the accuracy and feasibility of the present disclosure, after finding the rumor propagation source, the prediction result needs to be further confirmed. FIG. 6 shows prediction effect of the average accuracy of single-source localization on three real network graphs of Jazz, Facebook, and Twitch-ES according to the embodiment of the present disclosure. In a single prediction, if the real propagation source and the predicted propagation source are consistent, the accuracy of the single experiment is 1, otherwise it is 0. We obtain the average accuracy by averaging over 1000 independent experiments. The axis of abscissa represents the deployment ratio of the sensors, and 20%, 30%, and 40% of the deployment ratios are respectively selected in the embodiment of the present disclosure. The "Detection Rate" in the coordinate axis represents the predicted average accuracy. The higher the predicted average accuracy is, the better the algorithm's ability to predict the true propagation source is. It can be seen from FIG. 6 that the algorithm based on the full-order neighbor coverage strategy (FNSI) provided by the present disclosure is superior to other algorithms on all datasets, and the average accuracy of localization is about 30% higher than that of the best localization method among other algorithms.

Figure 7:
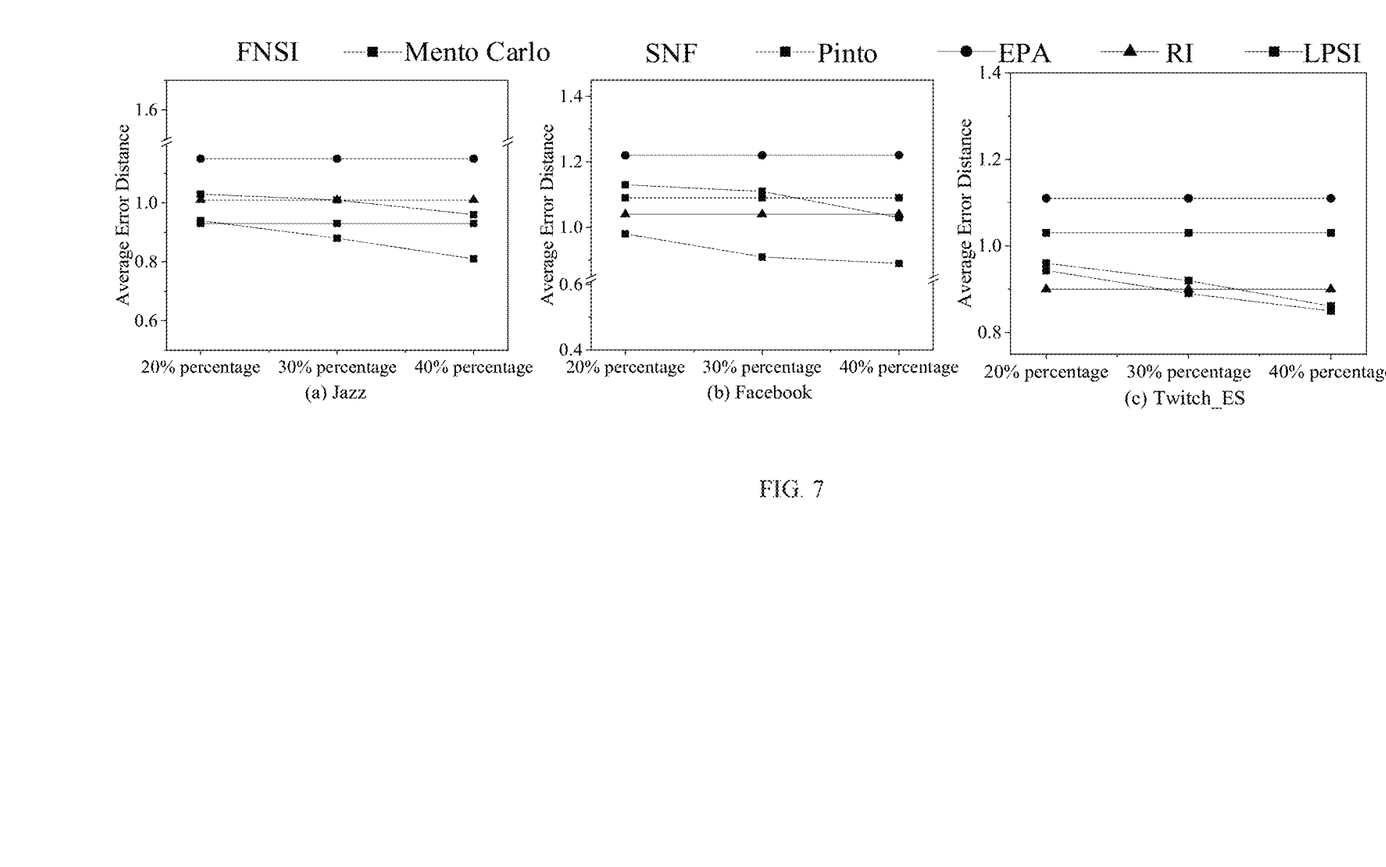
FIG. 7 schematically shows average error distance of single-source localization on three real network graphs of Jazz, Facebook, and Twitch-ES according to an embodiment of the present disclosure.

FIG. 7 shows prediction effect of the average error distance of single-source localization on three real-word datasets of Jazz, Facebook and Twitch-ES according to the embodiment of the present disclosure. If the real propagation source and the predicted propagation source are consistent, the error distance of the single experiment is 0, otherwise the error distance of the single experiment is the minimum distance between the real propagation source and the predicted propagation source, and the minimum distance is a positive integer. We obtain the average error distance by averaging over 1000 independent experiments. The axis of abscissa represents the deployment ratio of sensors, and 20%, 30%, and 40% of the deployment ratios of sensors are respectively selected. The "Average Error Distance" in the coordinate axis represents the predicted average error distance. The smaller the predicted average error distance is, the better the algorithm's ability to predict the true propagation source is. It can be obtained from FIG. 7 that the proposed method (FNSI) in the present disclosure is superior to other algorithms on all datasets, and the average error distance is about 30% lower than that of the best localization method among other algorithms.

Thus, the network-graph-based algorithm provided in the present disclosure is a source localization method for a source based on full-order neighbor coverage strategy, which can locate the propagation source in a smaller area by deploying sensors basing the full-order neighbor coverage and effectively using the structural topology information and sensors' propagation information based on the graph theory. Locating the propagation source in a small area can not only improve the prediction accuracy, but also ensure that the loss is minimized by early locating. The algorithm solves the localization problem by the deployment strategy of sensors based full-order neighbor coverage, so less prior information is required. In reality, the algorithm of the present disclosure can be executed without collecting high-cost and high-overhead infection information. At the same time, the heterogeneous propagation model used in the present disclosure is close to the actual scenarios, which makes the algorithm of identifying source in the present disclosure have practical guiding significance. Finally, the propagation model and source localization method in the present disclosure are applied to locate the propagation source of the real-word datasets, and the ability to successfully predict the propagation source is high, which provides a scientific basis for the internet identifying rumor.

It should be noted that the embodiments described above are only used to illustrate the technical solutions of the present disclosure, but not intended to limit the present disclosure. Although the present disclosure has been described in detail above with reference to the embodiments, it should be understood that those skilled in the art can still make some modifications, replacements and variations based on the content disclosed herein. Understandably, any modifications and replacements made by those skilled in the art without departing from the spirit of the disclosure should fall within the scope of the disclosure defined by the appended claims.

What is claimed is:

1. A source localization method for rumor based on full-order neighbor coverage strategy, comprising:
   (S1) inputting a user relationship database in an actual target area requiring sensor deployment and source localization;
   (S2) constructing and initializing a network graph G=(V, E) based on the actual target area; wherein after the user relationship database is input, an actual relationship is mapped into the network graph G; V is a set of nodes corresponding to users in the actual target area; E is a set of edges, and the connected edges in the network graph G indicate that corresponding two users know each other in the actual target area; and all nodes in the network graph G are initialized to a susceptible state which means the corresponding users in the actual area do not receive a rumor;
   (S3) deploying observation users in the actual target area according to the network graph G; wherein sensors are selected in the network graph G with a deployment ratio φ using the full-order neighbor coverage strategy; the full-order neighbor coverage strategy is configured to ensure that there are sensors in each order neighbor of any node in the network graph G; and users in the actual target area corresponding to the deployed sensors in the network graph G are marked as the observation users to record time and direction when they receive propagation information of the rumor;
   (S4) when the number of observation users who have received rumor's propagation information reaches four in the actual target area, performing a source inferring strategy to detect a source of the rumor;
   (S5) mapping time and direction recorded by the observation users to the network graph G;
   (S6) locating the source of the rumor by using graph theory with a topological structure of the network graph G; wherein an initial source likelihood score $Score'_v$ of a non-sensor node v in the network graph G corresponding to a non-observation user in the actual target area is calculated through a following formula:
   wherein $\overline{O}$ is a set of sensors in the network graph G corresponding to the observation users who have received the propagation information of the rumor in the actual target area; $|\overline{O}|$ represents a number of elements in the $\overline{O}$, and $|\overline{O}|$ is 4; $d_{i,v}$ is a shortest distance between a sensor i and the non-sensor node v in the network graph G; and $t_i$ denotes a timestamp at which the sensor i observes the rumor in the network graph G, corresponding to the observation user in the actual target area;
   (S7) differentially processing source likelihood scores; wherein for any non-sensor node, if there is a first-order neighbors belonging to sensors who has not received the propagation information of the rumor, a source likelihood score of such a non-sensor node is multiplied by a penalty coefficient α to reduce possibility of a corresponding user becoming the source of the rumor; and α is a real number between 1 and 1.1;
   (S8) traversing all non-sensor nodes, and obtaining nodes with a minimum source likelihood score; and predicting the user in the actual target area related to the nodes with a minimum source likelihood score in the network graph G as an original rumor source in real life.

2. The source localization method of claim 1, wherein the step (S3) is performed through steps of:
   (S31) selecting initially sensors in the network graph G by using the full-order neighbor coverage strategy to ensure that for each node in the network graph G, there is at least one sensor in each order neighbor from a first-order neighbor to an eccentricity-order neighbor of the node, so as to allow the sensors to be widely deployed in the network graph G;
   (S32) determining whether a ratio of the sensors selected by using the full-order neighbor coverage strategy to the network graph G reaches the deployment ratio φ; if no, further selecting non-sensor nodes in the network graph G by using other strategies; and selecting more sensors in the network graph G until the deployment ratio φ is reached; and
   (S33) marking the users who are sensors in the network graph G as the observation users in the actual target area.

3. The source localization method of claim 2, wherein in step (S32), the other strategies comprise random selection of sensors and selection of nodes with the highest degree in the network graph G as the sensors.

4. The source localization method of claim 1, wherein in the step (S7), the source likelihood score is processed through a following formula:

$$Score_v = Score'_v * \Pi_{j=1}^{j=neighbor(v) \cap O\overline{O}} \alpha;$$

wherein $Score'_v$ is the initial source likelihood score of the non-sensor node v in the network graph G corresponding to the non-observation user in the actual target area obtained in the step (S6); α is the penalty coefficient configured to increase penalty for nodes in the network graph G corresponding to users in the actual target area who are unlikely to be the source of the rumor, and is equal to 1.05; neighbor(v) is a first-order neighbor of the non-sensor node v in the network graph G; O is a set of the sensors corresponding to the observation users with the deployment ratio φ in the actual target area, and the deployment ratio φ is 20%, 30% or 40%; and $\overline{O}$ is the set of sensors corresponding to the observation users in the actual target area who have received the propagation information of the rumor.

5. The source localization method of claim 1, wherein the deployment ratio φ is 20%, 30% or 40%.

6. The source localization method of claim 1, wherein the penalty coefficient α is 1.05.

* * * * *